Patented Jan. 18, 1938

2,105,760

UNITED STATES PATENT OFFICE 2,105,760

PROCESS FOR THE PRODUCTION OF ZEIN

Lloyd C. Swallen, Terre Haute, Ind., assignor, by mesne assignments, to Corn Products Refining Company, New York, N. Y., a corporation of New Jersey No Drawing. Application May 8, 1935, Serial No. 20,401

2 Claims. (Cl. 87—28)

My invention relates to an improved process for extracting zein from the mixed proteins of maize. More particularly, my invention relates to a process for extracting zein from maize proteins in a form suitable for use in the production of plastics.

It has long been known that zein could be extracted from maize meal or from mixed maize proteins such as gluten meal by extraction with aqueous alcohol. However, the processes used in the past have been designed primarily for laboratory preparations, and I have found that such processes are not suitable for producing zein for use in the preparation of plastics. In this case the physical nature of the product is extremely important in addition to its chemical properties or its adhesive properties. It is necessary that the material be in a form which is adapted to plastic flow at suitable temperatures in the presence of curing agents such as formaldehyde. I have found that the prior extraction processes have either given yields too low to be of commercial interest or have produced a product having insufficient plasticity for the preparation of plastics.

I have now discovered that if the extraction process is carried out under carefully controlled conditions, satisfactory yields may be obtained and the product will possess the desired plasticity. To obtain this result I have found that it is necessary to control both the temperature at which the extraction is carried out and the hydrogen ion concentration of the extraction medium. To obtain a satisfactory product the temperature for the extraction should be maintained between 55 and 65° C. The hydrogen ion concentration of the liquid at the completion of the extraction should correspond to a pH of at least 6.0 or at least be within the range of 6.0–7.0 as measured by brilliant yellow indicator paper. A suitable hydrogen ion concentration is obtained when the liquid at the end of the extraction will turn brilliant yellow indicator paper to a faint orange, corresponding to a pH of about 6.5. When operating under these conditions I have found that very satisfactory yields may be obtained and that the product will plastify readily with formaldehyde and produce plastics of excellent strength and elasticity.

My improved operating conditions may be applied to any known extraction process. The extraction medium may comprise aqueous ethyl alcohol of 92–93% concentration by volume. The operation may be carried out in any suitable apparatus and according to any of the known procedures. A suitable process, for example, comprises adding 93% ethyl alcohol to ground gluten meal in a suitable vessel, agitating gently during the desired extraction period, decanting, and repeating the process until the extraction has been carried to the desired extent. The alcohol should be brought to a temperature such that after adding it to the meal the resulting temperature is within the preferred range 55–65° C.

The hydrogen ion concentration will, in practically every case, be found to be too high so that it will be necessary to adjust the material to the desired pH by means of alkali. Furthermore, the pH will be found to drop as the extraction proceeds so that it will be necessary to make adjustments from time to time so that the final pH will fall within the desired limits. Of course, after preliminary experiments with any given meal have been completed it will be possible to add the entire amount of alkali at the beginning of the extraction. Such a procedure would be practically necessary if a countercurrent extraction were employed. Any suitable alkali may be utilized for this purpose, but I prefer to use sodium hydroxide for economic reasons and because of its solubility in most extraction media.

My invention may perhaps best be illustrated by the following specific example: 100 lbs. of gluten meal ground to pass an 8 mesh screen but not a 20 mesh screen was placed in a percolator and covered with 35 gallons of hot 93% ethyl alcohol containing 2 liters of 6.5 N sodium hydroxide. The temperature of the resulting mass was approximately 60° C. and the initial pH was approximately 8.0. The mass was gently agitated for a period of 2 hours, after which the liquid was drained off. For higher temperatures the time may be shorter. For lower temperatures it should be longer in order to obtain equivalent yields. Longer periods of treatment tend to affect detrimentally the quality of the product. The extract at this point had a pH of 6.5 as measured by brilliant yellow indicator paper. The residue was then washed 3 times with small quantities of 93% ethyl alcohol and these extracts were added to the original strong extract. The combined extract was found to contain 23.5 lbs. of zein after purification by the usual procedures. The purified dried product was readily soluble in 93% alcohol and had excellent plasticity. When made into a plastic, the resulting product was found to be a clear light-colored hard material having satisfactory toughness and elasticity and a transverse strength of 11,500 lbs. per sq. inch.

It will be understood, of course, that in commercial operation the above process would be modified to utilize the washing solutions for preliminary extraction of subsequent batches, or the process could be carried out according to a strictly countercurrent method. This example is only illustrative and is not to be construed as limiting the scope of my invention. In general it may be said that any equivalents or any modifications of procedure which would naturally occur to one skilled in the art may be employed without departing from the scope of my invention.

My invention now having been described, what I claim is:

1. Process for extracting zein from proteinaceous material derived from maize to give a stable solution which comprises contacting said material with ethyl alcohol of about 92%–93% concentration at a temperature of about 55°–65° C., with the hydrogen ion concentration adjusted during the extraction to such a point that the pH of the final extract falls within the range of about 6.0–7.0.

2. Process for extracting zein from proteinaceous material derived from maize to give a stable solution which comprises contacting said material with ethyl alcohol of about 92%–93% concentration at a temperature of about 55°–65° C., with the hydrogen ion concentration adjusted during the extraction to such a point that the pH of the final extract falls within the range of about 6.0–7.0 and continuing the extraction over a period not substantially in excess of two hours.

LLOYD C. SWALLEN.